(12) United States Patent
Bohnke et al.

(10) Patent No.: US 9,296,856 B2
(45) Date of Patent: Mar. 29, 2016

(54) RIGID POLYURETHANE FOAMS WITH UNIFORM CELL SIZE DISTRIBUTION AND HOMOGENEOUS OPEN-CELL CONTENT

(71) Applicant: Bayer Intellectual Property GmbH, Monheim (DE)

(72) Inventors: Lutz Bohnke, Overath (DE); Joern Beaujean, Leverkusen (DE); Rolf Albach, Köln (DE)

(73) Assignee: Covestro Deutschland AG, Leverkusen (DE)

( * ) Notice: Subject to any disclaimer, the term of this patent is extended or adjusted under 35 U.S.C. 154(b) by 130 days.

(21) Appl. No.: 14/222,851

(22) Filed: Mar. 24, 2014

(65) Prior Publication Data
US 2014/0288204 A1    Sep. 25, 2014

(30) Foreign Application Priority Data
Mar. 25, 2013  (EP) .................................... 13160745

(51) Int. Cl.
| | | |
|---|---|---|
| *C08G 18/76* | (2006.01) | |
| *C08G 18/48* | (2006.01) | |
| *C08G 18/40* | (2006.01) | |
| *C08G 101/00* | (2006.01) | |

(52) U.S. Cl.
CPC ........ *C08G 18/7657* (2013.01); *C08G 18/4018* (2013.01); *C08G 18/485* (2013.01); *C08G 18/4816* (2013.01); *C08G 18/7671* (2013.01); *C08G 18/4804* (2013.01); *C08G 18/4812* (2013.01); *C08G 2101/0025* (2013.01); *C08G 2101/0058* (2013.01); *C08G 2101/0083* (2013.01)

(58) Field of Classification Search
CPC ........... C08G 18/4804; C08G 18/4812; C08G 18/4816
USPC ......................................................... 521/174
See application file for complete search history.

(56) References Cited

U.S. PATENT DOCUMENTS

| | | |
|---|---|---|
| 5,219,893 A | 6/1993 | Konig et al. |
| 5,482,979 A | 1/1996 | Sanders et al. |
| 2006/0142407 A1* | 6/2006 | Hollmann .......... C08G 18/1825 521/172 |

FOREIGN PATENT DOCUMENTS

| | | |
|---|---|---|
| EP | 0437787 A1 | 7/1991 |
| EP | 0629607 A2 | 12/1994 |

\* cited by examiner

*Primary Examiner* — Melissa Rioja
(74) *Attorney, Agent, or Firm* — Drinker Biddle & Reath LLP

(57) ABSTRACT

The present invention relates to predominantly open-cell, cold-deformable, rigid polyurethane foams which possess a uniform cell structure with similar cell sizes and similar physical properties, more particularly a similar open-cell content. These foams are suitable for producing automotive interior trim, more particularly roof linings and pillar trim.

5 Claims, No Drawings

RIGID POLYURETHANE FOAMS WITH UNIFORM CELL SIZE DISTRIBUTION AND HOMOGENEOUS OPEN-CELL CONTENT

RELATED APPLICATIONS

This application claims benefit of European application 13160745.9, filed Mar. 25, 2013, which is incorporated herein by reference in its entirety for all its useful purposes.

FIELD OF THE INVENTION

The present invention relates to predominantly open-cell, cold-deformable, rigid polyurethane foams which possess a uniform cell structure with similar cell sizes and similar physical properties, more particularly a similar open-cell content. These foams are suitable for producing automotive interior trim, more particularly roof linings and pillar trim.

BACKGROUND OF THE INVENTION

Rigid polyurethane (PU) foams as an interlayer for sandwich structures (shaped sandwich panels), and also the use thereof in the production of automotive interior trim, are known per se.

Sandwich structures for use as roof lining or pillar trim are nowadays usually produced by the cold-forming process from corresponding sandwich panels. In this process, the rigid PU foam panel is provided on both sides with a thermosetting adhesive and with reinforcing materials, such as mats or webs of glass fibre and/or natural fibre, and/or glass fibre rovings, and also with outer layers of paper, thermoplastic films and/or nonwoven fibre webs, and optionally decorative layers, and are subjected to deformation and pressing to a sandwich in a mould at temperatures of 100 to 150° C.

In the batch production of foam slabs (referred to as "box foaming") there are differences in the cell sizes and physical properties, and particularly in the open-cell content, within a foam block. In the top and bottom regions, the cell sizes are smaller than in the middle. The cell sizes in the centre of a block are generally the greatest. With the use of isocyanates and polyol formulations, of the kind described in EP 0437787 A1, the cell sizes within a foam block differ significantly from one another depending on their location. The open-cell content and, less markedly, other physical properties too, likewise fluctuate. Particularly in the case of large-sized blocks with a volume of several cubic meters and heights of around 1 m, a markedly lower open-cell content is found in the lower region of the foam block.

In EP 0437787 A1, thermoplastically deformable rigid PU foams having densities of 25-30 kg/m$^3$ are prepared by reaction of mixtures of diphenylmethane diisocyanates (MDI) and polyphenyl-polymethylene polyisocyanates (p-MDI) having an MDI content of 70 to 90 wt %, based on the isocyanate mixture, of which 12-30 wt % constitutes 2,4'-diphenylmethane diisocyanate, and with 10-30 wt %, based on the isocyanate mixture, of polyphenyl-polymethylene polyisocyanates (p-MDI) with a polyol mixture made up of 50 to 70 wt % (based on the polyol formulation) of a di- and/or trifunctional polyoxyalkylene polyol having a hydroxyl number of 28 to 600, 20 to 35 wt % of a difunctional phthalic acid polyester having a hydroxyl number of 150 to 440, 2 to 10 wt % of glycerol, 3.5 to 7 wt % of water, 0.3 to 1 wt % of an incorporable tertiary amine catalyst and 0.1 to 2 wt % of a silicone foam stabilizer.

These foams, however, exhibit considerable differences in foam structure depending on the location of the foam block. At the top and bottom, the foams are more finely cellular, i.e. the cell sizes are smaller, and in the middle the foams are more coarsely cellular, with the cell sizes therefore being larger. This is detrimental to the further processing to form, for instance, car roof linings. The foam block is cut into panels, which have different cell sizes in comparison to one another depending on their position within the foam block. This can lead to complications when these panels are processed to form sandwich structures.

It is an object of the present invention to prepare predominantly open-cell rigid PU foams with an extremely homogeneous cell structure. The panels produced therefrom are to be able to be pressed by the cold-forming process into sandwich structures, e.g. automotive interior trim and car roof linings.

It has been found that surprisingly, through the use of hexafunctional polyoxyalkylene polyols, the cell sizes within a foam block differ much less significantly from one another. At the same time, the physical properties within a foam block are also more homogeneous, and so on further processing to sandwich structures, for example, the metering of adhesive can be kept more constant and hence the reject rate can be reduced.

EMBODIMENTS OF THE INVENTION

An embodiment of the present invention is a predominantly open-cell, cold-formable, rigid polyurethane foam with >50 vol % open-cell content to DIN ISO 4590-86 and with a uniform cell structure, obtained by reacting an organic polyisocyanate component A) comprising A1) 0 to 10 wt %, based on the organic polyisocyanate component A), of 2,2'-diphenyl-methane diisocyanate, A2) 0 to 30 wt %, based on the organic polyisocyanate component A), of 2,4'-diphenyl-methane diisocyanate and A3) 25 to 75 wt %, based on the organic polyisocyanate component A), of 4,4'-diphenylmethane diisocyanate, with a component B consisting of B1) 20 to 70 wt %, based on component B, of a polyoxyalkylene polyol having a hydroxyl number of 25 to 60 mg KOH/g and a number-average functionality of 2 to 4, B2) 20 to 50 wt %, based on component B, of a polyoxypropylene polyol having a hydroxyl number of 300 to 900 mg KOH/g and a number-average functionality of 2.5 to 4, B3) 0 to 25 wt %, based on component B, of a polyoxyalkylene polyol having a hydroxyl number of 150 to 550 mg KOH/g and a functionality of 2, B4) 0 to 20 wt %, based on component B, of a polyol containing an ester group and having a hydroxyl number of 200 to 500 mg KOH/g and a number-average functionality of 2 to 5, B5) 0.1 to 15 wt %, based on component B, of a propylene oxide-ethylene oxide copolymer having a hydroxyl number of 25 to 200 mg KOH/g and a functionality of 5 to 8, B6) 0 to 3 wt %, based on component B, of glycerol, B7) 1 to 7 wt %, based on component B, of water, B8) 0.5 to 4 wt %, based on component B, of a catalyst B9) optionally an auxiliary and/or an adjuvant, the NCO index is from 85 to 125, and the sum of components B1) to B9) is 100 wt %.

Another embodiment of the present invention is a method for producing a composite element or a sandwich structure utilizing the rigid polyurethane foam according to Claim 1.

Another embodiment of the present invention is a method comprising utilizing the rigid polyurethane foam according to Claim 1 in automotive and utility-vehicle construction, for automotive interior trim, roof linings and pillar trim, as substrates for the printing industry, and as partition walls for building applications.

Another embodiment of the present invention is a composite element comprising the rigid polyurethane foam according to Claim 1.

Another embodiment of the present invention is a sandwich structure comprising the rigid polyurethane foam according to Claim 1.

DETAILED DESCRIPTION OF THE INVENTION

Determining the Cell Sizes

The cell sizes and the cell size distribution were determined as follows:

The foam samples were cut using a razor blade into slices with a thickness of approximately 3 mm. Using a light microscope from Keyence, 5 photographs were prepared of the cut surface of each foam sample, in transmitted light, with 16 times magnification. The cell dimensions were measured by means of the AnalySIS Pro image analysis software from Olympus.

The arithmetic mean of all the diameters for the angles from 0° to 179° in 1° steps gives the average diameter of an individual cell. Around 1000 individual cells in each foam sample were subjected to measurement, in order to obtain statistically relevant values. Determined from the average diameters were the arithmetic mean, the standard deviation, the median, and the largest and smallest values.

"Predominantly open-cell" is understood to refer to an open-cell content to DIN EN ISO 4590-1986 of 50% or more.

By "cold-formable" is meant that the rigid foam sandwich can be deformed in accordance with the known cold-forming process.

The rigid PU foams of the invention are produced preferably by a batchwise process. They are used preferably for producing automotive interior trim, more particularly roof linings and pillar trim.

The polyisocyanate component used comprises preferably mixtures of 4,4'-, 2,4'- and 2,2'-diphenylmethane diisocyanates and polyphenyl-polymethylene polyisocyanates (crude MDI). Particularly well established are crude MDI grades having a diphenylmethane diisocyanate isomer content of 50 to 70 wt %.

Used with preference as component B1) are polyoxyalkylene polyols in the hydroxyl number range from 25 to 40 mg KOH/g, which are available preferably by reaction of ethylene oxide and/or propylene oxide with trihydric polyols, such as glycerol, trimethylolpropane for example, or with dihydric polyols, such as ethylene glycol, water, 1,2-propylene glycol, neopentyl glycol, bisphenols, for example, and others.

Used with preference as component B2) are polyoxyalkylene polyols in the hydroxyl number range from 380 to 650 mg KOH/g, which are obtainable preferably by reaction of ethylene oxide and/or propylene oxide with polyols, such as glycerol, trimethylolpropane, triethanolamine, ethylenediamine, ortho-tolyldiamine, mixtures of sugar and/or sorbitol with glycols, etc.

Used as component B3) are difunctional polyoxyalkylene polyols in the hydroxyl number range from 150 to 550, which are available preferably by reaction of ethylene oxide and/or propylene oxide with glycols, such as ethylene glycol, diethylene glycol, 1,2- or 1,3-propylene glycol, 1,4-butanediol, neopentyl glycol, bisphenols and others.

Finding preferred use as component B4) are polyols containing ester groups and situated in the hydroxyl number range from 200 to 500 mg KOH/g, which are preparable preferably by esterification of phthalic anhydride, terephthalic acid, isophthalic acid, glutaric acid, succinic acid and/or adipic acid with ethylene glycol, diethylene glycol or propylene glycol, butanediol, hexanediol, trimethylolpropane, glycerol, and others. Particularly preferred is the use of a reaction product of phthalic anhydride, diethylene glycol and ethylene oxide.

Used as component B5) are preferably hexafunctional propylene oxide-ethylene oxide copolymers in the hydroxyl number range from 25 to 200, which are obtainable preferably by reaction of ethylene oxide and propylene oxide with sorbitol and its isomers. Particularly preferred is a fraction of ≥10 wt % ethylene oxide units, relative to (B5).

The catalysts (B8) include compounds which accelerate the reaction for producing the foam. Those contemplated include organometallic compounds, preferably organotin compounds, such as tin(II) salts of organic carboxylic acids, for example tin(II) acetate, tin(II) octoate, tin(II) ethylhexanoate and tin(II) laurate, and the dialkyltin(IV) salts of organic carboxylic acids, for example dibutyltin diacetate, dibutyltin dilaurate, dibutyltin maleate, dioctyltin diacetate, bismuth salts and zinc salts, and also tertiary amines such as triethylamine, tributylamine, dimethylcyclohexylamine, dimethylbenzylamine, N-methylimidazole, N-methyl, N-ethyl and N-cyclohexylmorpholine, N,N,N',N'-tetramethylethylenediamine, N,N,N',N'-tetramethylbutylenediamine, N,N,N',N'-tetra-methylhexylene-1,6-diamine, pentamethyldiethylenetriamine, tetramethyldiaminoethyl ether, bis(dimethylaminopropyl)urea, dimethylpiperazine, 1,2-dimethylimidazole, 1-azabicyclo-3.3.0]octane, 1,4-diazabicyclo[2.2.2]octane, and alkanolamine compounds such as triethanolamine, trisisopropanolamine, N-methyl- and N-ethyl-diethanolamine and dimethylethanolamine. Catalysts contemplated further include the following: tris(dialkylamino)-s-hexahydrotriazines, more particularly tris(N,N-dimethylamino)-s-hexahydrotriazine, tetraalkylammonium salts such as, for example, N,N,N-trimethyl-N-(2-hydroxypropyl)-ammonium formate, N,N,N-trimethyl-N-(2-hydroxypropyl)-ammonium 2-ethylhexanoate, tetraalkylammonium hydroxides such as tetramethylammonium hydroxide, alkali metal hydroxides such as sodium hydroxide, alkali metal alkoxides such as sodium methoxide and potassium isopropoxide, and also alkali metal salts or alkaline earth metal salts of fatty acids with 1 to 20 C atoms and optionally pendant OH groups.

Preference is given to using isocyanate-reactive tertiary amines such as, for example, N,N-di-methylaminopropyl amine, bis(dimethylaminopropyl)amine, N,N-dimethylaminopropyl-N'-methylethanolamine, dimethylaminoethoxyethanol, bis(dimethylaminopropyl)amino-2-propanol, N,N-dimethylaminopropyldipropanolamine, N,N,N'-trimethyl-N'-hydroxyethyl bisaminoethyl-ether, N,N-dimethylaminopropylurea, N-(2-hydroxypropyl)imidazole, N-(2-hydroxyethyl)-imidazole, N-(2-aminopropyl)imidazole, 2-((dimethylamino)ethyl)methylaminopropanol, 1,1'-((3-(dimethylamino)propyl)imino)bis-2-propanol and/or the reaction products described in EP-A 0 629 607 of ethyl acetoacetate, polyether polyols and 1-(dimethylamino)-3-aminopropane, and also, in particular, the tall oil acid amide salt of N,N-dimethylaminopropylamine.

Auxiliaries and/or adjuvants B9) that can be used include, for example, colorants, foam stabilizers, inorganic fillers, emulsifiers, cell openers and flame retardants.

Examples of suitable foam stabilizers include siloxane-polyoxyalkylene copolymers, organopolysiloxanes, ethoxylated fatty alcohols and alkylphenols, fatty acid-based amine oxides and betaines, and esters of castor oil and/or ricinolic acid.

Active cell openers include, for example, paraffins, polybutadienes, fatty alcohols and optionally polyalkylene oxide-modified dimethylpolysiloxanes.

Further examples of auxiliaries and/or adjuvants B9) for optional accompanying use in accordance with the invention are emulsifiers, reaction retarders, stabilizers against effects of ageing and of weathering, plasticizers, inorganic flame retardants, phosphorus- and/or halogen-containing organic flame retardants, substances with fungistatic and bacteriostatic activity, pigments and dyes, and also the customary organic and inorganic fillers that are known per se. Examples that may be given of emulsifiers include ethoxylated alkylphenols, alkali metal salts of fatty acids, alkali metal salts of sulphated fatty acids, alkali metal salts of sulphonic acids, and salts of fatty acids and amines.

Further details of the mode of use and mode of action of the aforementioned auxiliaries and/or adjuvants are described for example in Kunststoff-Handbuch, Polyurethane, Volume VII, Carl Hanser Verlag, Munich, Vienna, $2^{nd}$ edition, 1983.

The foam of the invention is prepared by mixing the polyol formulation with the polyisocyanate component in the weight ratios in general of 100:150 to 100:200. This mixing is normally accomplished by means of a low-pressure foaming machine, such as a Cannon C 300 or Hennecke HK 5000 R, for example. Production of blocks takes place batchwise, with the foamable mixture being poured into a box of appropriate size, the base area of said box being determined by the later size of the car roof lining. The block is subsequently cut—or split, in the jargon of the art—into corresponding panels.

The purpose of the examples which follow is to elucidate the invention in more detail.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Production of the Rigid PU Foams:

Inventive Example 1

A mixture (component B) of
30.0 parts by weight of polyether alcohol (B1) based on glycerol/propylene oxide/ethylene oxide, OH number 28 mg KOH/g, functionality 3,
34.0 parts by weight of polyether alcohol (B2) based on trimethylolpropane/propylene oxide, OH number 550 mg KOH/g, functionality 3,
15.0 parts by weight of polyester ether alcohol (B4) based on phthalic anhydride/diethylene glycol/ethylene oxide, OH number 300 mg KOH/g, functionality 2,
12.0 parts by weight of polyether alcohol (B3) based on propylene glycol/propylene oxide, OH number 512 mg KOH/g, functionality 2,
0.50 part by weight of polyoxyalkylene polyols (B5), based on sorbitol/propylene oxide/ethylene oxide, OH number 100 mg KOH/g and a functionality of 6,
6.40 parts by weight of water (B7)
1.80 parts by weight of a reaction product as described in EP 0629607 A2 of ethyl acetoacetate, polyether polyols and 1-(dimethylamino)-3-aminopropane with a functionality of about 2-3 and an OH number of 111 mg KOH/g (B8),
0.30 part by weight of silicone foam stabilizer (Niax® Silicone SR 234 from Momentive Performance Materials) (B9),
0.50 part by weight of Isopur N black paste from ISL-Chemie of Kürten, DE (B9)
was mixed with
182 parts by weight of a technical isocyanate with a fraction of about 14 wt %, based on organic polyisocyanate component A), of 2,4'-diphenylmethane diisocyanate and of about 45 wt %, based on organic polyisocyanate component A), of 4,4'-diphenylmethane diisocyanate, and with an NCO content of 31.8 wt %.

Comparative Example 1

A mixture (component B) of
30.0 parts by weight of polyether alcohol (B1) based on glycerol/propylene oxide/ethylene oxide, OH number 28 mg KOH/g, functionality 3,
34.0 parts by weight of polyether alcohol (B2) based on trimethylolpropane/propylene oxide, OH number 550 mg KOH/g, functionality 3,
15.0 parts by weight of polyester ether alcohol (B4) based on phthalic anhydride/diethylene glycol/ethylene oxide, OH number 300 mg KOH/g, functionality 2,
12.0 parts by weight of polyether alcohol (B3) based on propylene glycol/propylene oxide, OH number 512 mg KOH/g, functionality 2,
0.30 part by weight of silicone foam stabilizer (Niax® Silicone SR 234 from Momentive) (B9),
6.40 parts by weight of water (B7)
1.80 parts by weight of a reaction product as described in EP 0629607 A2 of ethyl acetoacetate, polyether polyols and 1-(dimethylamino)-3-aminopropane (B8),
0.50 part by weight of Isopur N black paste from ISL-Chemie of Kürten, DE (B9)
was mixed with
182 parts by weight of a technical isocyanate with a fraction of about 14 wt %, based on organic polyisocyanate component A), of 2,4'-diphenylmethane diisocyanate and of about 45 wt %, based on organic polyisocyanate component A), of 4,4'-diphenylmethane diisocyanate, and with an NCO content of 31.8 wt %.

Foam blocks with a block size of 30 cm×30 cm×30 cm were produced. These and foam panels from large-size blocks (1.4 m×2.2 m×1.0 m) were tested and evaluated.

For this purpose, the bottom 5 cm of the foam blocks (30×30×30 cm) were cut away. This region generally possesses defects resulting from cell opening at the end of the reaction. Beyond this, a foam panel 1 cm thick was employed for the determination of the cell sizes (bottom). The foam panel 5 cm thick located above this was utilized for the purpose of determining the physical properties. Then comes a layer 3 cm thick, which was not used. Above that is a layer 1 cm thick in which the cell sizes (middle) were measured. Over that is a layer of around 5 cm for determining the physical properties (middle), followed by a layer 4 cm thick, which was not used. Then a 1 cm panel was separated off for the purpose of determining the cell sizes (top), and above it a layer with a maximum thickness of 5 cm was separated off, from which the physical properties (top) were ascertained.

Table 1 below contains the cell sizes (measured as described above in the text) from Inventive Example 1:

| Cell sizes | Number of specimens 1004 Top | Number of specimens 990 Middle | Number of specimens 1053 Bottom | Mean | Standard deviation |
|---|---|---|---|---|---|
| D10 | 138 μm | 152 μm | 136 μm | 142.0 μm | 8.7 μm |
| D25 | 192 μm | 213 μm | 188 μm | 197.7 μm | 13.4 μm |

-continued

| Cell sizes | Number of specimens 1004 Top | Number of specimens 990 Middle | Number of specimens 1053 Bottom | Mean | Standard deviation |
|---|---|---|---|---|---|
| D50 | 282 µm | 315 µm | 292 µm | 296.3 µm | 16.9 µm |
| D75 | 409 µm | 445 µm | 428 µm | 427.3 µm | 18.0 µm |
| D90 | 536 µm | 601 µm | 564 µm | 567.0 µm | 32.6 µm |
| lowest measurement | 85.6 µm | 62.8 µm | 63.1 µm | 70.5 µm | 13.1 µm |
| highest measurement | 1598.1 µm | 1673.7 µm | 1316.3 µm | 1529.4 µm | 188.4 µm |
| arithmetic mean | 321.5 µm | 358.2 µm | 331.5 µm | 337.0 µm | 19.0 µm |

D90 means that 90% of all the cells from the top region of the foam block possess a size of up to 536 µm, up to 601 µm in the middle region and up to 564 µm in the bottom region of the foam block. The arithmetic mean is the mean value from 1004 individual measurements. The mean reported in the fifth column indicates the respective mean of the three numbers to its left. The corresponding standard deviation is 32.6 µm.

Similarly, for example, D25 means that 25% of all the cells from the top region possess a size of up to 192 µm, up to 213 µm in the middle and up to 188 µm in the bottom region of the foam block.

D10, D50 and D75 mean, correspondingly, that 10%, 50% and 75%, respectively, of all the cells have corresponding sizes from the three regions.

Table 2 below contains cell sizes for Comparative Example 1:

| Cell sizes | Number of specimens 1180 Top | Number of specimens 976 Middle | Number of specimens 1090 Bottom | Mean | Standard deviation |
|---|---|---|---|---|---|
| D10 | 121 µm | 135 µm | 129 µm | 128.3 µm | 7.0 µm |
| D25 | 169 µm | 188 µm | 185 µm | 180.7 µm | 10.2 µm |
| D50 | 254 µm | 300 µm | 261 µm | 271.7 µm | 24.8 µm |
| D75 | 374 µm | 445 µm | 377 µm | 398.7 µm | 40.2 µm |
| D90 | 543 µm | 605 µm | 522 µm | 556.7 µm | 43.2 µm |
| lowest measurement | 73.2 µm | 87.0 µm | 71.8 µm | 77.3 µm | 8.4 µm |
| highest measurement | 1634.5 µm | 1811.7 µm | 980.3 µm | 1475.5 µm | 437.9 µm |
| arithmetic mean | 302.1 µm | 347.8 µm | 298.9 µm | 316.2 µm | 27.4 µm |

Looking at half of the cells or more (D50, D75, D90), the cell size distribution becomes significantly more homogeneous as a result of the use of hexafunctional polyether alcohol. This finding can be seen directly from the reported standard deviations and also from a visual comparison of the different cell structures.

Table 3 below contains the physical properties from Inventive Example 1.

| Test data | Standard | | Top | Middle | Bottom | Mean | Standard deviation |
|---|---|---|---|---|---|---|---|
| Gross density | DIN 53420 | kg/cm$^3$ | 23.0 | 22.2 | 23.9 | 23.0 | 0.7 |
| Compression test | DIN EN826 | kPa | 84 | 99 | 111 | 98 | 11 |
| Open-cell content | DIN ISO 4590-86 | vol % | 79 | 75 | 72 | 75 | 3 |
| Tensile strength | DIN 53430 | kPa | 179 | 173 | 181 | 178 | 3 |
| Elongation at break | DIN 53430 | % | 19 | 18 | 20 | 19 | 1 |

Table 4 below contains the physical properties from Comparative Example 1.

| Test data | Standard | | Top | Middle | Bottom | Mean | Standard deviation |
|---|---|---|---|---|---|---|---|
| Gross density | DIN 53420 | kg/cm$^3$ | 21.9 | 22.7 | 22.7 | 22.4 | 0.4 |
| Compression test | DIN EN826 | kPa | 90 | 110 | 108 | 103 | 9 |
| Open-cell content | DIN ISO 4590-86 | vol % | 74 | 52 | 78 | 68 | 11 |
| Tensile strength | DIN 53430 | kPa | 171 | 159 | 181 | 170 | 9 |
| Elongation at break | DIN 53430 | % | 19 | 18 | 22 | 20 | 2 |

The physical properties as well (tensile strength and elongation at break) become more homogeneous overall. In particular, however, the open-cell content becomes significantly more homogeneous, and this improves the further processing to sandwich structures, since the amounts of adhesive to be applied do not have to be continually adapted to changing penetration of adhesive into open pores. The more constant elongation at break is also an advantage, since it means that adaption of the use of reinforcing materials must be practised less often and that subsequent machining can be reduced.

Inventive Example 2

A mixture (component B) of 30.0 parts by weight of polyether alcohol (B1) based on glycerol/propylene oxide/ethylene oxide, OH number 28 mg KOH/g, functionality 3, 34.2 parts by weight of polyether alcohol (B2) based on trimethylolpropane/propylene oxide, OH number 550 mg KOH/g, functionality 3, 15.0 parts by weight of polyester ether alcohol (B4) based on phthalic anhydride/diethylene glycol/ethylene oxide, OH number 310 mg KOH/g, functionality 2, 12.0 parts by weight of polyether alcohol (B3) based on propylene glycol/propylene oxide, OH number 512 mg KOH/g, functionality 2, 0.30 part by weight of polyoxyalkylene polyols (B5), based on sorbitol/propylene oxide/ethylene oxide, OH number 100 mg KOH/g, functionality of 6, 1.9 parts by weight of reaction product of ethyl acetoacetate, a polyether alcohol based on trimethylolpropane/propylene oxide (OH number 550 mg KOH/g) and 1-(dimethylamino)-3-aminopropane in analogy to EP 0 629 607 (B8), 0.30 part by weight of silicone foam stabilizer (Niax® Silicone SR 234 from Momentive Performance Materials) (B9), 5.8 parts by weight of water (B7)

0.5 part by weight of Isopur N black paste (B9)

was mixed with 172 parts by weight of a technical isocyanate with a fraction of about 21 wt %, based on organic polyisocyanate component A), of 2,4'-diphenylmethane diisocyanate and of about 44 wt %, based on organic polyisocyanate component A), of 4,4'-diphenylmethane diisocyanate, and with an NCO content of about 31.9 wt %.

Comparative Example 2

A mixture (component B) of 30.0 parts by weight of polyether alcohol (B1) based on glycerol/propylene oxide/ethylene oxide, OH number 28 mg KOH/g, functionality 3, 34.5 parts by weight of polyether alcohol (B2) based on trimethylolpropane/propylene oxide, OH number 550 mg KOH/g, functionality 3, 15.0 parts by weight of polyester ether alcohol (B4) based on phthalic anhydride/diethylene glycol/ethylene oxide, OH number 310 mg KOH/g, functionality 2, 12.0 parts by weight of polyether alcohol (B3) based on propylene glycol/propylene oxide, OH number 512 mg KOH/g, functionality 2, 1.9 parts by weight of reaction product of ethyl acetoacetate, a polyether alcohol based on trimethylolpropane/propylene oxide (OH number 550 mg KOH/g) and 1-(dimethylamino)-3-amino-propane in analogy to EP 0 629 607 (B8), 0.30 part by weight of silicone foam stabilizer (Niax® Silicone SR 234 from Momentive Performance Materials) (B9), 5.8 parts by weight of water (B7)

0.5 part by weight of Isopur N black paste (B9)

was mixed with 172 parts by weight of a technical isocyanate with a fraction of about 21 wt %, based on organic polyisocyanate component A), of 2,4'-diphenylmethane diisocyanate and of about 44 wt %, based on organic polyisocyanate component A), of 4,4'-diphenylmethane diisocyanate, and with an NCO content of about 31.9 wt %.

The table below contains the physical properties from Inventive Example 2:

| Test data | Standard | | Top | Middle | Bottom | Mean | Standard deviation |
|---|---|---|---|---|---|---|---|
| Gross density | DIN 53420 | kg/cm$^3$ | 23.9 | 25.9 | 22.8 | 24.20 | 1.57 |
| Compression test | DIN EN826 | mPa | 0.081 | 0.105 | 0.104 | 0.097 | 0.014 |
| Open-cell content | DIN ISO 4590-86 | vol % | 84.9 | 89.7 | 80.4 | 85.03 | 4.66 |

-continued

| Test data | Standard | | Top | Middle | Bottom | Mean | Standard deviation |
|---|---|---|---|---|---|---|---|
| Tensile strength | DIN 53430 | N/mm² | 0.245 | 0.172 | 0.198 | 0.205 | 0.037 |
| Elongation at break | DIN 53430 | % | 18.2 | 20.8 | 20.6 | 19.83 | 1.44 |

The table below contains the physical properties from Comparative Example 2:

| Test data | Standard | | Top | Middle | Bottom | Mean | Standard deviation |
|---|---|---|---|---|---|---|---|
| Gross density | DIN 53420 | kg/cm³ | 20.0 | 21.0 | 24.0 | 21.67 | 2.08 |
| Compression test | DIN EN826 | mPa | 0.060 | 0.050 | 0.120 | 0.077 | 0.038 |
| Open-cell content | DIN ISO 4590-86 | vol % | 85.7 | 90.1 | 74.8 | 83.5 | 7.86 |
| Tensile strength | DIN 53430 | N/mm² | 0.185 | 0.212 | 0.248 | 0.215 | 0.032 |
| Elongation at break | DIN 53430 | % | 23.0 | 17.7 | 25.7 | 22.1 | 4.05 |

The comparison of Inventive Example 2 with Comparative Example 2 shows that the use of hexafunctional polyols in accordance with the invention, even in small amounts, produced an improvement of 25% in the scattering of the gross density (represented by the standard deviation). The scatter of the compressive strength was improved by 63%, the scatter of the open-cell content by 40%, and the scatter of the elongation at break by 64%. The improved homogeneity of the mechanical properties of such foam panels had considerable advantages on further processing, since the further processing did not always have to be adapted again and again to altered properties, such as the absorption of adhesives or the utilization of reinforcing materials in the course of subsequent further processing, for example.

The invention claimed is:

1. A predominantly open-cell, cold-formable, rigid polyurethane foam with >50 vol % open-cell content to DIN ISO 4590-86 and with a uniform cell structure, obtained by reacting an organic polyisocyanate component A) comprising
   A1) 0 to 10 wt %, based on the organic polyisocyanate component A), of 2,2'-diphenyl-methane diisocyanate,
   A2) 0 to 30 wt %, based on the organic polyisocyanate component A), of 2,4'-diphenyl-methane diisocyanate and
   A3) 25 to 75 wt %, based on the organic polyisocyanate component A), of 4,4'-diphenylmethane diisocyanate, with a component B) consisting of
   B1) 20 to 70 wt %, based on component B), of a polyoxyalkylene polyol having a hydroxyl number of 25 to 60 mg KOH/g and a number-average functionality of 2 to 4,
   B2) 20 to 50 wt %, based on component B), of a polyoxypropylene polyol having a hydroxyl number of 300 to 900 mg KOH/g and a number-average functionality of 2.5 to 4,
   B3) 0 to 25 wt %, based on component B), of a polyoxyalkylene polyol having a hydroxyl number of 150 to 550 mg KOH/g and a functionality of 2,
   B4) 0 to 20 wt %, based on component B), of a polyol containing an ester group and having a hydroxyl number of 200 to 500 mg KOH/g and a number-average functionality of 5 to 8,
   B5) 0.1 to 15 wt %, based on component B), of a propylene oxide-ethylene oxide copolymer having a hydroxyl number of 25 to 200 mg KOH/g and a functionality of 5 to 8,
   B6) 0 to 3 wt %, based on component B), of glycerol,
   B7) 1 to 7 wt %, based on component B, of water,
   B8) 0.5 to 4 wt %, based on component B), of a catalyst, and
   B9) optionally an auxiliary and/or an adjuvant, said reacting organic polyisocyanate component A) with component B) is performed at an NCO index in the range of 85 to 125, and the sum of the weights of components B1) to B9) is 100 wt %.

2. A method for producing a composite element or a sandwich structure utilizing the rigid polyurethane foam according to claim 1.

3. A method comprising utilizing the rigid polyurethane foam according to claim 1 in an application selected from the group consisting of automotive and utility-vehicle construction, automotive interior trim, roof linings and pillar trim, as substrates for the printing industry, and as partition walls for building applications.

4. A composite element comprising the rigid polyurethane foam according to claim 1.

5. A sandwich structure comprising the rigid polyurethane foam according to claim 1.

* * * * *